(No Model.)
J. BECKER.
MILLING MACHINE.
No. 474,898. Patented May 17, 1892.
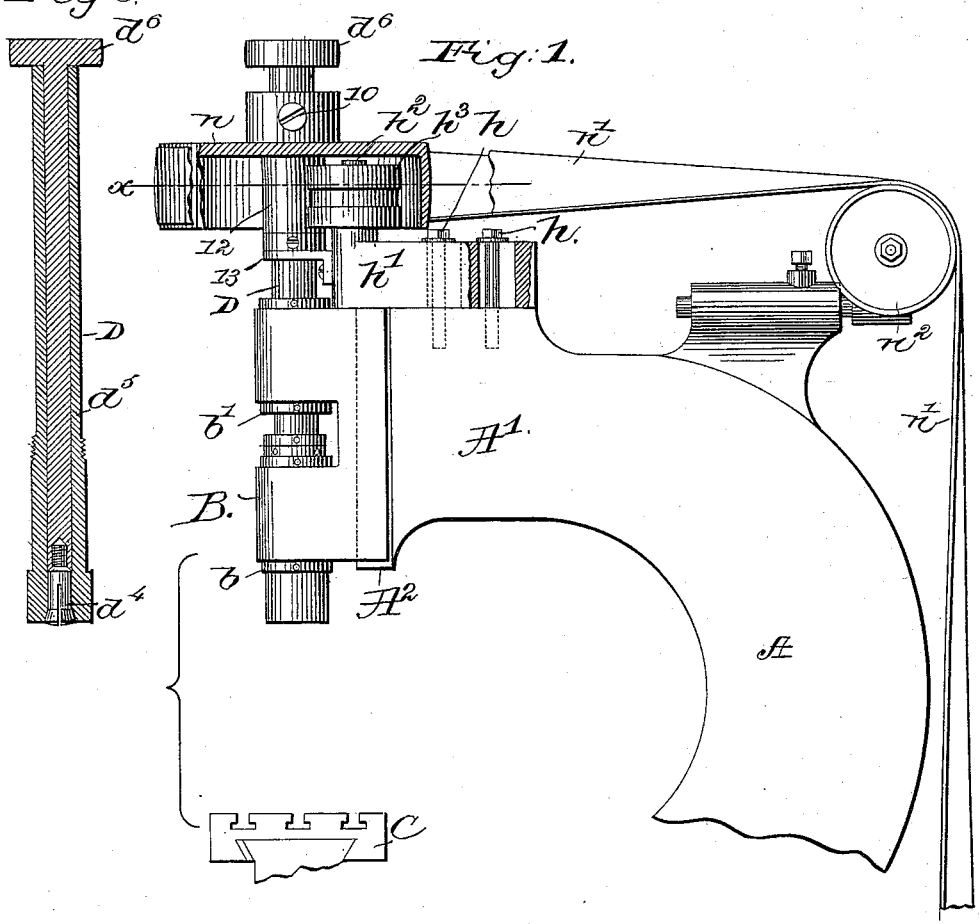
Witnesses.
Fred S. Greenleaf.
Edward F. Allen
Inventor:
John Becker
by Crosby & Gregory Attys.

UNITED STATES PATENT OFFICE.

JOHN BECKER, OF NEWTON, MASSACHUSETTS.

MILLING-MACHINE.

SPECIFICATION forming part of Letters Patent No. 474,898, dated May 17, 1892.

Application filed June 25, 1891. Serial No. 397,510. (No model.)

*To all whom it may concern:*

Be it known that I, JOHN BECKER, of Newton, county of Middlesex, State of Massachusetts, have invented an Improvement in Milling-Machines, of which the following description, in connection with the accompanying drawings, is a specification, like letters and figures on the drawings representing like parts.

This invention has for its object to improve milling-machines in such manner that the spindles may be run at high speed with the minimum of friction and without liability of the spindle heating its usual bearings so as to stop the spindle. The spindle in the machine herein to be described may be run practically at a speed of many thousand rotations per minute.

The gist of my invention consists in providing the machine with rolling or anti-friction bearings to support the spindle against the strain of the driving-belt in rotating the spindle, the latter at a little distance from the said roller-bearings having usual stationary bearings which surround, or substantially so, the spindle. The roller-bearings are made adjustable with relation to the fixed bearings, so that the center of rotation of the spindle may be aligned centrally with relation to the centers of the stationary bearings, so that the said spindle may rotate freely in the stationary bearings without being drawn against one more than against another side thereof.

Figure 1 of the drawings, in side elevation, represents a sufficient portion of a milling-machine embodying my invention to enable the same to be understood, the said figure showing part of the work-supporting bed of usual form; Fig. 2, a section below the line $x$, Fig. 1; and Fig. 3 is a longitudinal section of the spindle, chuck, and chuck-rod. Fig. 4 is a modification.

The frame-work consists, essentially, of a column A and a head A', having at its front end a dovetailed guide $A^2$, on which is adapted to slide vertically a carriage B, having bearings $b$ $b'$ for the spindle D, the said carriage in practice being made vertically movable in any usual manner.

C represents a work-supporting bed or holder, which may be of any usual construction and be operated in usual manner by any usual devices.

The lower part of the spindle D, represented as hollow, has a split jaw-chuck $d^4$ of usual construction connected to a chuck-rod $d^5$, having an attached hand-wheel $d^6$, the lower end of the said chuck being beveled to co-operate with a surrounding beveled surface of the spindle D. The chuck-rod at its lower end has a threaded opening, (see Fig. 3,) into which may be screwed the threaded upper end of the chuck, or the said spindle may receive and hold in any usual manner any usual milling-tool.

Upon the upper end of the head A, I have adjustably attached by screws $h$ a stand $h'$, it having suitable studs $h^2$ to receive the journals of a pair of anti-friction rollers or wheels $h^3$ $h^4$, which constitute the lateral bearings for the spindles in the line of the belt-pull, the adjustment of the said rollers and stand enabling the center of rotation of the spindle to be placed coincident with the centers of the bearings $b$ $b'$, the roller-bearings thus resisting all the strain of the belt and relieving the bearings $b$ $b'$ from such strain.

The spindle D near its upper end has fixed upon it by screw 10 a driving-pulley $n$, about which is extended the endless belt $n'$, carried over usual idle-pulleys $n^2$ and thence about some usual driving-pulley rotated in usual manner at proper speed by or through some usual belt (not shown) on a cone or other equivalent pulley, all as common in milling-machines and drills. In this instance of my invention I have shown the belt-pulley $n$ as hollow or flanged and as provided with a sleeve-like extension 12. The hollow or flanged pulley enables the roller-bearing to be located between the periphery of the belt-pulley and the center of rotation of the spindle, which is an important feature of my invention, as it adds greatly to compactness of parts and to the steadiness of rotation of the spindle. The sleeve-like extension 12 fits the spindle, and in this instance bears directly against the roller-bearings $h^4$; but it is obvious that my invention would not be departed from in principle if the said sleeve should be omitted, as in Fig. 4, and the spindle bears directly against the said rollers. The use of the extension 12 is, however, of advantage, for in such case the spindle is left entirely free from any frictional wear and the long sleeve also aids to prevent any strains on the pulley from deflecting the spindle and also enables the spindle to be made light weight.

I have not shown any means for raising and lowering the carriage, as I may employ any usual means for that purpose. Where the extension 12 is used, its lower end rests on a support-plate 13, attached to the stand $h'$; but in case the said extension is not used the spindle will have a collar attached thereto in the usual manner to bear on the said support, the support sustaining the weight of the pulley and spindle and parts carried by it.

In a modification of my invention, application Serial No. 386,957, I have shown a set of bearing-rolls both above and below the pulley.

Adjusting the stand $h'$ enables the acting faces of the anti-friction bearings or wheels to be so adjusted and located with relation to the inner sides of the bearings $b\ b'$ and the center of rotation of the spindle that the center of the said spindle may be placed centrally with relation to the openings in the bearings $b\ b'$, and this adjustment may be made so accurately that, theoretically, with but the slightest fraction of an inch in diameter between the spindle and the interior of the bearings $b\ b'$, surrounding it, the said spindle may be rotated in the said bearings without touching the same, for by having the roller-bearings in the line in which the stress of the band for rotating the spindle is put upon the spindle all side strain on the spindle due to the stress of the band upon the pulley is borne by the rolling surfaces rather than by the stationary bearings $b\ b'$.

In many varieties of work it is a great desideratum to be able to rotate the spindle of a milling-tool at a very high speed, and a small tool at high speed may be made to do a great variety of work with great rapidity.

In another application, Serial No. 386,957, filed by me on the 30th day of March, 1891, I have shown a milling-tool spindle as jointed loosely to a carrier having roller or anti-friction bearings, the entire strain or stress of the band upon the carrier being resisted by said roller-bearings. In the said application the carrier and spindle are jointed loosely together; but herein the spindle itself and not the carrier is provided with a driving-pulley, and practically the spindle herein described is a rigid spindle from one to its other end.

I claim—

1. In a milling-machine, a rotating spindle having an attached pulley, combined with bearings for the main part of the spindle and rolling bearings located in or adjacent to the line of and adapted to resist lateral strain of the belt used to rotate the pulley and spindle, substantially as and for the purpose described.

2. In a milling-machine, a rotating spindle having an attached pulley, combined with bearings for the main part of the spindle and rolling bearings located in or adjacent to the line of belt-pull, the said roller-bearings being made adjustable longitudinally with relation to the bearings which receive the main part of the spindle to thereby place the center of rotation of the said spindle centrally with relation to the bearings in which it rotates, the said roller-bearings acting to resist lateral strain of the belt used to rotate the pulley and spindle, substantially as and for the purpose described.

3. In a milling-machine, a spindle, bearings for the body portion thereof, and a pulley attached to said spindle and cut away at one side to leave a central sleeve, and a flange or rim at its periphery for the reception of a belt, combined with roller-bearings located within said pulley-rim and serving to resist lateral strain due to the belt, substantially as described.

In testimony whereof I have signed my name to this specification in the presence of two subscribing witnesses.

JOHN BECKER.

Witnesses:
GEO. W. GREGORY,
EMMA J. BENNETT.